United States Patent [19]
McDonald

[11] 3,896,399
[45] July 22, 1975

[54] LOOP FILTER FOR DELTA MODULATOR

[75] Inventor: James A. McDonald, Buffalo Grove, Ill.

[73] Assignee: Motorola, Inc., Chicago, Ill.

[22] Filed: July 19, 1973

[21] Appl. No.: 380,784

[52] U.S. Cl. .............................. 332/11 D; 328/38 B
[51] Int. Cl. .............................................. H03k 13/22
[58] Field of Search ............ 332/9 R, 9 T, 10, 11 R, 332/11 D, 18, 19; 325/38 R, 38 A, 38 B, 41, 42, 141, 143; 328/110, 118, 119

[56] References Cited

UNITED STATES PATENTS

| | | | |
|---|---|---|---|
| 2,745,063 | 5/1956 | DeJager | 332/11 D |
| 3,706,944 | 12/1972 | Keene Tewksbury | 332/11 D |

OTHER PUBLICATIONS

Hellwarth et al., "Push Pull Feedback Delta Modulator," December 1968, IBM Technical Disclosure Bulletin, Vol. 11, No. 7, December 1968, pp. 877–878.

*Primary Examiner*—Alfred L. Brody
*Attorney, Agent, or Firm*—Eugene A. Parsons; Vincent J. Rauner

[57] ABSTRACT

An improved loop filter-integrator for a delta modulator having a bandpass characteristic for increasing the dynamic range of the modulator to modulating signals having frequencies within the pass-band of the filter. Means are provided for emphasizing frequencies within the bandwidth of the modulating signals relative to frequencies above and below the modulating signal band, and to maintain the phase shift of the filter within the limits necessary to provide modulator stability.

20 Claims, 8 Drawing Figures

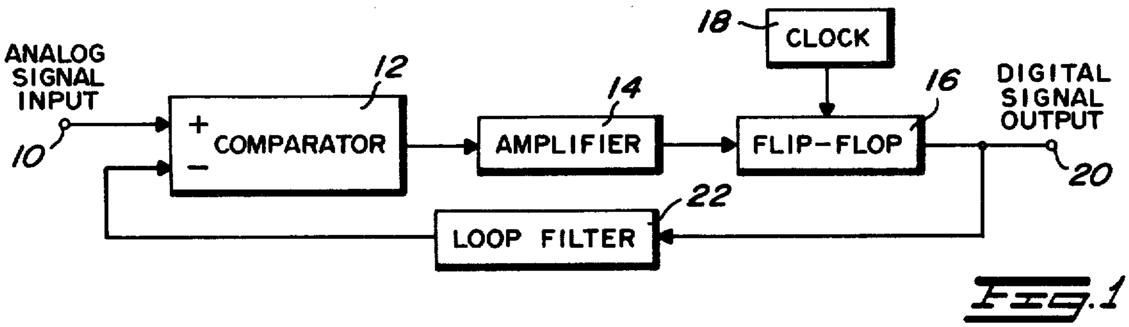
FIG. 1
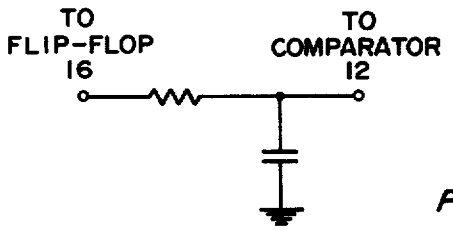
PRIOR ART
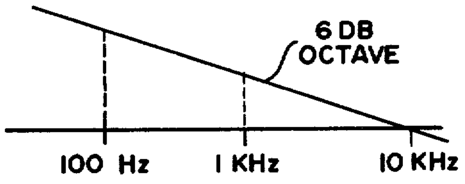
FIG. 2
FIG. 2a
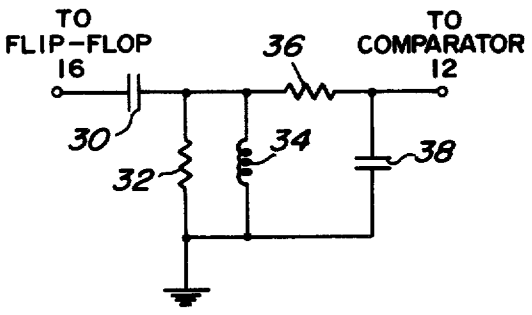
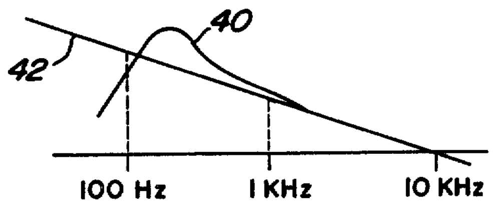
FIG. 3
FIG. 3a

PATENTED JUL 22 1975 SHEET 2 3,896,399

LOOP FILTER FOR DELTA MODULATOR

BACKGROUND

1. Field of Invention

This invention relates generally to modulators for converting analog to digital signals, and more particularly to delta modulators having an improved loop filter for increasing the dynamic range of the modulator within a predetermined band of frequencies.

There are many applications wherein it is necessary to provide a modulator for converting analog signals into digital signals. One such application is in a digital voice transmission system of the privacy type wherein voice signals are converted into binary digits prior to transmission to prevent unauthorized interception of confidential messages. The binary digits generated by the modulator may be transmitted directly, or may be combined with a pseudo random bit sequence prior to transmission to increase the degree of security.

2. Prior Art

Several techniques for converting analog signals to binary signals are known. One such system utilizes a delta modulator employing a single or double integrator in the feedback loop thereof to convert the analog signal into binary digits.

Whereas this technique provides a simple way to convert an analog signal into a digital bit stream, the distortion produced by a delta modulator, particularly a modulator utilizing a single integrator in the feedback loop, is substantial. The distortion can be reduced by increasing the bit rate or by employing a double integrator, however, increasing the bit rate increases the bandwidth of the digital signal, and the use of a double integrator provides only a slight improvement and tends to make the modulator unstable.

SUMMARY

It is an object of the present invention to provide a loop filter for a delta modulator that improves the dynamic range and distortion performance of the modulator.

It is a further object of this invention to provide a delta modulator using an improved loop filter which permits reduction of the bit rate without a substantial degradation in distortion performance.

In accordance with a preferred embodiment of the invention, a bandpass filter provides as much attenuation as possible above and below the frequency band of the modulating signal consistent with phase shifts that do not generate undesired instabilities. The aforementioned filter may be synthesized utilizing, for example, a conventional resistance-capacitance integrator in conjunction with an under-damped high pass filter. In another embodiment, several signal tuned or doubled tuned bandpass filters coupled to suitable phase correcting networks may be used.

DESCRIPTION OF THE DRAWINGS

In the drawings:

FIG. 1 shows, in block diagram form, a typical delta modulator, including a loop filter;

FIG. 2 shows a circuit diagram of a single integrator type loop filter according to the prior art;

FIG. 2*a* is a graph of the amplitude characteristic of the loop filter of FIG. 2;

FIG. 3 is a circuit diagram of one embodiment of an improved loop filter for a delta modulator according to the invention;

FIG. 3*a* shows the amplitude characteristic of the circuit of FIG. 3 relative to the amplitude characteristic of the prior art circuit of FIG. 2;

DETAILED DESCRIPTION

Figure 4:
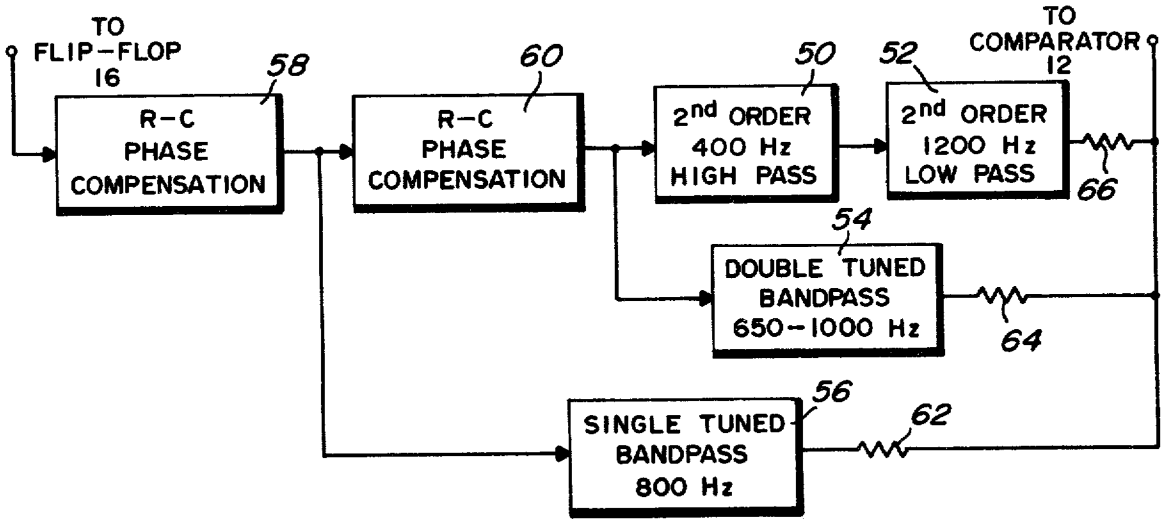
FIG. 4 is a block diagram of another embodiment of the improved loop filter according to the invention.

Referring to FIG. 1, a delta modulator has a comparator 12 having a non-inverting input connected to an analog signal input point 10. The output of the comparator 12 is connected to an input of an amplifier 14 which has an output connected to a flip-flop 16. An enabling input of the flip-flop 16 is connected to the output of a clock 18, and the output of the flip-flop 16 is connected to a digital signal output point 20 and to a loop filter 22. The output of the loop filter 22 is connected to an inverting input of the comparator 12.

In operation, an analog signal, such as, for example, a audio signal having a predetermined bandwidth is applied to the input point 10. The analog input signal from point 10 is compared with the signal from the loop filter 22 by the comparator 12 which provides a signal to the amplifier 14 indicative of the difference between the analog signals from point 10 and the loop filter 22. The signal from the comparator 12 is amplified by the amplifier 14 and used to control the state or condition of the flip-flop 16. The flip-flop 16 provides either a 1 or a 0 when a clock pulse is received thereby. Whether a 1 or a 0 is generated is determined by the signal applied to the flip-flop 16 by the amplifier 14. For example, if the signal applied to the input point 10 is greater than the signal from the loop filter 22, the signal from the amplifier 14 will cause the flip-flop 16 to provide a 1 when the next clock pulse is received. Conversely, if the signal at input point 10 is less than the signal from the loop filter 22, a 0 will be provided by the flip-flop 16. The digital signal provided by the flip-flop 16 is applied to the signal output point 20 and to the loop filter 22, which integrates the digital signal from the flip-flop 16 to provide an analog signal to the comparator 12 for comparison with the input signal from point 10. Decoding of the digital signal from point 20 is accomplished by utilizing an integrator similar to the loop filter 22 at the receiver to regenerate the analog signal. The clock 18 provides pulses to the flip-flop 16 at a predetermined rate, each pulse enabling the flip-flop 16 to respond to the signal from the amplifier 14 to generate either a 1 or a 0.

The performance of the delta modulator shown in FIG. 1 is to a large extent determined by its dynamic range. Accordingly, the concept of dynamic range will be used to explain the relevant concepts of the instant invention, and to show the improvement over the prior art provided by the present invention. The upper limit of the dynamic range of a delta modulator at a particular modulating frequency is determined by the magnitude of the output signals from the flip-flop 16 and the effect of the loop filter 22 on the output signals from the flip-flop 16 at that particular frequency. For example, if a large amplitude signal is applied to the input point 10, a 1 having a particular amplitude is generated by the flip-flop 16. Since the 1 from the flip-flop 16 is integrated by the loop filter 22 to approximate the analog input signal, the magnitude of the integrated signal from the loop filter 22 resulting from the integrated 1 must be sufficiently large to allow the integrated signal to follow the analog signal applied to the input point 10. If the effect on the integrated signal caused by output 1's from the flip-flop 16 is small, the slope of the signal provided by the loop filter 22 as a result of integrating the 1's will be less than the slope of the input analog signal, and a faithful reproduction of the input analog signal will not be achieved. The aforesaid condition is commonly known as slope limiting or slope overload.

The lower limit of the dynamic range of a delta modulator is determined by the attenuation of the loop filter 22 to signals at one-half the clock frequency. Under conditions of no audio input, the output of a delta modulator is an idle pattern consisting of alternating 1's and 0's which, when integrated by the loop filter 22 provide the closest approximation to the zero voltage analog signal input. Because the magnitude of the 1's is the same whether an idle pattern or modulation is present, it is desirable to provide as much attenuation as possible to the idle pattern to provide the zero approximation. The loop filter 22, which integrates the 1–0 bit stream, provides a substantially triangular waveform having a positive slope when a 1 is present and a negative slope when a 0 is present the average value of the integrated waveform being equal to zero, and the peak-to-peak value being related to the magnitude of the signals from the flip-flop 16 and the attenuation to one-half the clock frequency provided by the loop filter 22. The integrated waveform need not be a perfect triangle and will generally be determined by the response of the loop filter used. Since the aforementioned substantially triangular waveform is applied to the comparator 12 even with no signal being applied to the input point 10, any signal applied to the input point 10 smaller than the peak-to-peak value of the triangular waveform does not appreciably affect the operation of the delta modulator, and hence signals having an amplitude smaller than the peak-to-peak value of the triangular wave from the loop filter 22 cannot be encoded. Hence, the peak-to-peak value of the triangular waveform defines the threshold, or the minimum analog input signal necessary to interrupt the idle pattern, and difference in attenuation provided by the loop filter 22 to modulating the frequencies relative to one-half the clock frequency determines the dynamic range of the delta modulator.

In delta modulators of the prior art, the loop filter 22 generally comprises a simple resistance capacitance integrator as shown in FIG. 2. FIG. 2 shows the 6 db/octave amplitude characteristic of a simple integrator such as the one shown in FIG. 2. If we assume that the analog signal applied to the input point 10 is a band limited audio signal having a frequency band extending from 300 Hz to 3 KHz, and a clock frequency of 20 KHz, the difference in attenuation between 1 KHz audio signal and one-half the clock frequency, or 10 KHz is 20 db. This results in a 20 db dynamic range for the delta modulator for 1 KHz input signals when a simple integrator is used. The dynamic range decreases at 6db/octave for modulating signals in excess of 1 KHz. Reference to FIG. 2a also shows the reason an increase in the clock rate results in an increase in modulator performance. For example, if the clock rate is doubled to 40 KHz, the difference in attenuation provided by the loop filter of FIG. 2 between a 1 KHz modulating tone and one-half the 40 KHz clock rate, or 20 KHz is 26 db rather than 20 db, resulting in a 6 db improvement in dynamic range. Other prior art attempts to improve dynamic range by increasing the slope of the integrator response curve by utilizing a double integrator rather than a 6 db/octave simple integrator have provided some improvement, however, substantial improvements have not been obtained. Furthermore, a double integrator may cause instability, so in practical systems, the slope is limited to less than 12db/octave to prevent excessive phase shift which causes instability.

The dynamic range of a delta modulator can be significantly improved by utilizing a bandpass filter such as, for example, the high pass-low pass filter shown in FIG. 3. The circuit of FIG. 3 includes a high pass section including a capacitor 30, a resistor 32 and an inductor 34. The inductor 34 may be a passive inductor, as shown, or may be fabricated as an active inductor utilizing an active feedback network. The values of the inductor 34 and capacitor 30 are chosen to form a high pass filter having a passband beginning near the lower limit of the band of modulating frequencies, in this embodiment, approximately 300 Hz. The value of the resistor 32 is chosen to provide a slightly underdamped characteristic. The loop filter of FIG. 3 also includes a low pass filter comprising a resistor 36 and a capacitor 38. The resistor 36 and capacitor 38 provide integration for the digital bit stream from the flip-flop 16 and serve to attenuate the idle pattern at one-half the clock frequency. Although FIG. 3 shows a high pass filter followed by a low pass filter, the filters may be cascaded in either order to provide the desired bandpass characteristic. Furthermore, a second low pass filter may be connected in cascade with the circuit of FIG. 3 to provide a double integration.

The amplitude characteristic of the filter of FIG. 3 is shown in FIG. 3a. The amplitude characteristic of the filter of FIG. 3 is represented by the line 40, and a 6db/octave line 42 is shown to provide a comparison to the prior art integrator of FIG. 2. The underdamped characteristic of the high pass filter results in the line 40 being above the line 42 within the bandwidth of the analog singals, thereby providing a higher dynamic range within the frequency range of the modulating signal. The phase shift of the high pass filter portion of the filter of FIG. 3 is opposite the phase shift of the low pass portion, thereby reducing the total phase shift of the network, and stability is maintained. Stability in a delta modulator is actually a lack of undesired instability rather than absolute stability, since the idle pattern is really a form of desired instability. Furthermore, it has been noted experimentally that the attenuation of low frequencies provided by the filter of FIG. 3 results in improved modulator fidelity. It is believed that intermodulation components between harmonics of the analog signal and the clock signal provide low frequency distortion components, which are reduced by the low frequency cut off of the loop filter according to the invention, thereby providing a further improvement in modulator fidelity.

Referring to FIG. 4, there is shown a block diagram of another embodiment of the loop filter according to the invention utilizing a plurality of bandpass filters designed to maximize the filter response within the bandwidth of the modulating signals relative to the response above and below the modulating signal bandwidth while maintaining a phase shift consistent with modulator stability as previously defined. The circuit of FIG. 4 employs a second order high pass filter 50 followed by a second order low pass filter 52 to provide a high pass-low pass combination similar to the high pass-low pass circuit of FIG. 3 with the low pass portion of the circuit of FIG. 3 being replaced by a second order filter rather than the resistor 36 and capacitor 38. A double tuned bandpass filter 54 is connected in parallel with the series combination of the filter 50 and 52 to enhance the response within the 650 to 1,000 Hz range. A single tuned bandpass filter at 800 Hz is connected in parallel with the aforementioned filters to further enhance the response at 800 Hz. A pair of resistance-capacitance or R-C phase compensation networks 58 and 60 are connected in series with the various bandpass filters to prevent the total phase shift of the flip-flop 16 and the filter from approaching ± 180°. The phase shift of the flip-flop 16 must be considered because the flip-flop cannot respond until a clock pulse is received, and a random time delay is thereby introduced. The bandwidth of the R-C phase compensation networks 58 and 60 is broad compared to the bandwidth of the bandpass filters, and the parameters thereof are selected to provide the necessary overall phase characteristic with the amplitude characteristics of the filter being determined primarily by the bandpass filters. Three current summing resistors 62, 64 and 66 are employed to combine the outputs of the various bandpass filters and to provide a degree of isolation therebetween.

Figure 4A:
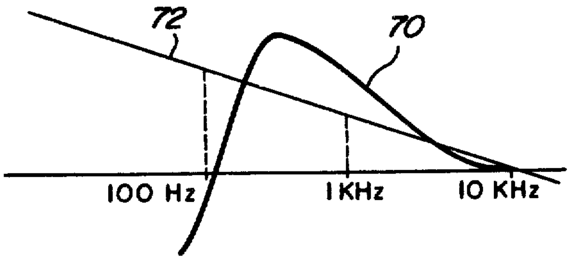
FIG. 4*a* shows the amplitude characteristic of the circuit of FIG. 4.

The amplitude characteristic of the circuit of FIG. 4 is indicated by the line 70 of FIG. 4*a*. As in FIG. 3*a*, a 6db/octave reference line 72 is provided to show the improvement in dynamic range over a standard simple integrator. The response characteristic of the circuit of FIG. 4, as shown by line 70, has been tailored to an analog modulating signal such as an audio signal having a bandwidth of 300–3,000 Hz. Note that the response of the circuit of FIG. 4 drops sharply below 300 Hz and above 3 KHz, and that the response is enhanced in the 300 Hz–3 KHz range. Hence, a delta modulator employing a loop filter similar to the filter shown in FIG. 4 has an increased dynamic range to frequencies within the 300 Hz–3 KHz range of modulating frequencies and a reduced response to frequencies outside of that range, thereby reducing out of band distortion and intermodulation resulting from the out of band distortion.

Figure 4B:
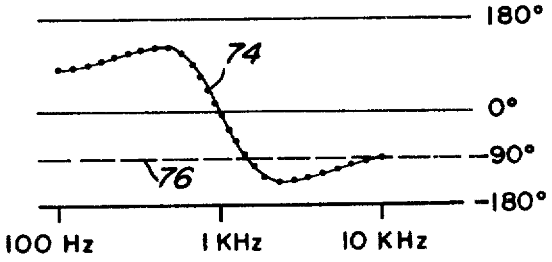
FIG. 4*b* is a graph of the phase characteristics of the prior art circuit of FIG. 2 and the circuit according to the invention of FIG. 4.

FIG. 4*b* shows the phase characteristic of the circuit of FIG. 4. In a delta modulator circuit as shown in FIG. 1, the total phase shift of the flip-flop 16 and the loop filter 22 must not reach 180° positive nor 180° negative nor an integral multiple of 180°, if undesired oscillation (other than the idle pattern) is to be avoided. For purposes of discussion, the idle pattern is not considered to be an oscillation. The line 74 of FIG. 4*b* shows the phase shift of the circuit of FIG. 4 relative to a relatively fixed 90° phase shift of a simple integrator, as indicated by the line 76. The rapid phase transition of the phase characteristic between nearly 180° positive and nearly 140° negative allows for the steep amplitude characteristic shown in FIG. 4*a*, but since the phase shift never reaches ± 180°, stability is maintained.

In this embodiment, as shown in FIG. 1, because the signals from the input 10 and the signals from the loop filter 22 are applied to opposite polarity inputs of the comparator 12, and because the input connected to the loop filter 22 is an inverting input, the total phase shift of the loop filter 22 and the flip-flop 16 must be maintained within the previously mentioned ± 180° limits. Should the input and feedback signals be applied to similar inputs of comparator 12, such as both inverting or both non-inverting inputs, then the necessary phase shift provided by the loop filter 22 must be adjusted accordingly, the criterion being that the loop provide negative feedback, and that in phase shifts resulting positive feedback which generates undesired oscillations be avoided. These criteria are well known in feedback theory, and simply stated, say that 0° or integral multiples of 360° phase shift around the loop must be avoided for all frequencies for which the loop gain exceeds unity. Because of the randomness of the phase shift provided by the flip-flop 16, the phase shift thereof being determined by the timing of the clock pulses relative to the modulating signal, the phase shift around the loop varies. As a result, the phase shift of the loop filter may be made very close to ± 180°, and the total phase shift of the flip-flop 16 and loop filter can be allowed to momentarily exceed ± 180° without causing sustained oscillation. Only short periods of oscillation will occur when the total phase shift exceeds ± 180°. The amount of oscillation that can be tolerated is best determined by listening tests.

Although two specific embodiments of improved loop filters for a delta modulator have been shown, it should be noted that any filter utilizing the concepts of this invention of providing a loop filter having an enhanced response to frequencies within the bandwidth of the modulating signal and the greatest possible attenuation to frequencies outside the bandwidth of the modulating signal, while maintaining phase shifts that are consistent with the well known stability criteria, falls within the scope and spirit of the invention.

I claim:

1. For use in a delta modulator for converting an analog signal having a predetermined band of frequencies into a digital signal having a predetermined clock rate greater than twice the highest frequency in said predetermined band, a loop filter coupled between an input and an output of the modulator, said filter comprising; means for receiving said digital signal connected to the output of the modulator, means coupled to said receiving means for filtering said digital signal to attenuate the frequencies of said digital signal lying above and below said predetermined band relative to the frequencies within said predetermined band to provide a band limited analog signal, and means connected to the input of the modulator for applying the band limited analog signal thereto.

2. A loop filter as recited in claim 1 wherein said loop filter includes a high pass filter, and a low pass filter connected in cascade with said high pass filter.

3. A loop filter as recited in claim 2 wherein said loop filter further includes a bandpass filter connected in parallel with said high and low pass filters.

4. A loop filter as recited in claim 3 wherein said loop filter further includes a resistance-capacitance phase compensation circuit connected to said high and low pass filters.

5. A loop filter as recited in claim 2 wherein said high pass filter is an underdamped high pass filter.

6. A delta modulator for providing a digital signal at an output point thereof in response to an analog signal having frequencies within a predetermined band applied to an input point thereof, including in combination:

means for comparing said analog signal with a second analog signal and providing a first discrete level signal when the amplitude of said first analog signal exceeds the amplitude of said second analog signal, and a second discrete level signal when the amplitude of said second analog signal exceeds the amplitude of said first analog signal, said comparing means being connected to said input point for receiving said first analog signal and to said output point for providing said first and second discrete level signals thereto to provide said digital signal; and loop filter means having an input connected to said output point and receiving said digital signal therefrom and providing said second analog signal in response thereto, said loop filter means including means for attenuating frequencies above and below said predetermined band to limit the bandwidth of said second analog signal.

7. A delta modulator as recited in claim 6 wherein said loop filter means further includes means for maintaining the phase relationship between said first and second analog signals within predetermined limits to prevent oscillation sustaining positive feedback.

8. A delta modulator as recited in claim 7 wherein said phase shift maintaining means includes means for preventing the phase shift between the input and the output of said loop filter means from attaining a value equal to an integral multiple of 180°.

9. A delta modulator as recited in claim 6 wherein said loop filter means includes a high pass filter and a low pass filter connected in cascade.

10. A delta modulator as recited in claim 6 wherein said loop filter includes a bandpass filter.

11. A delta modulator for providing digital signals in response to analog signals having frequencies within a predetermined band, including in combination:

means for receiving said analog signals;

comparison means having first and second inputs, and an output, for comparing signals applied to said inputs and providing an error signal at the output thereof in response to the difference of said signals, said first input being connected to said receiving means;

binary means having an input junction connected to the output of said comparison means, and an output junction, said binary means being responsive to said comparator means for providing a first discrete level signal when said error signal exceeds a predetermined magnitude and a second discrete level signal when said error signal is less than said predetermined magnitude;

clock means connected to said binary means for periodically rendering said binary means responsive to said comparison means at a predetermined clock rate greater than twice the highest frequency within said predetermined band; and loop filter means having an input terminal connected to the output junction of said binary means and an output terminal connected to said second input of said comparison means, said loop filter means having a bandpass characteristic for substantially passing signals having a frequency within said predetermined band from said input terminal to said output terminal, and for attenuating signals having frequencies above and below said predetermined band, said loop filter means providing a phase shift between said input and output terminals within predetermined limits for signals having frequencies within said predetermined band to prevent oscillation sustaining positive feedback.

12. A delta modulator as recited in claim 11 wherein said comparator means includes means for comparing the amplitudes of said analog signal and said signals passing through said loop filter, and wherein said loop filter means has a phase shift between the input and output terminals thereof of less than ± 180° to signals having frequencies within said predetermined band.

13. A delta modulator as recited in claim 11 wherein said loop filter means includes means for attenuating signals having frequencies substantially equal to one-half of the predetermined clock rate.

14. A delta modulator as recited in claim 13 wherein said loop filter means includes a high pass and a low pass filter connected in cascade.

15. A delta modulator as recited in claim 14 wherein said high pass filter is an underdamped high pass filter.

16. A delta modulator as recited in claim 15 wherein said high pass filter includes an inductor and a capacitor.

17. A delta modulator as recited in claim 15 further including a bandpass filter connected in parallel with said cascaded combination of high pass and low pass filters.

18. A delta modulator as recited in claim 17 further including phase correcting means connected to said cascaded combination of high and low pass filters for maintaining said phase shift within said predetermined limits.

19. A delta modulator as recited in claim 18 wherein said phase correcting means includes a resistance-capacitance network.

20. A delta modulator as recited in claim 17 further including a second bandpass filter connected in parallel with said parallel connected filters and said phase correcting means.

* * * * *